United States Patent
Leiseder

(10) Patent No.: US 8,573,849 B2
(45) Date of Patent: Nov. 5, 2013

(54) BEARING ARRANGEMENT HAVING AT LEAST TWO PARTS ROTATABLE RELATIVE TO ONE ANOTHER

(76) Inventor: Ulrich Leiseder, Reinbek (DE)

( * ) Notice: Subject to any disclaimer, the term of this patent is extended or adjusted under 35 U.S.C. 154(b) by 0 days.

(21) Appl. No.: 13/636,042

(22) PCT Filed: Mar. 26, 2011

(86) PCT No.: PCT/EP2011/054662
§ 371 (c)(1),
(2), (4) Date: Sep. 19, 2012

(87) PCT Pub. No.: WO2011/117412
PCT Pub. Date: Sep. 29, 2011

(65) Prior Publication Data
US 2013/0011091 A1   Jan. 10, 2013

(30) Foreign Application Priority Data
Mar. 26, 2010   (DE) .................... 20 2010 000 480 U

(51) Int. Cl.
*F16C 19/00* (2006.01)
*F16C 19/54* (2006.01)
*F16C 33/40* (2006.01)

(52) U.S. Cl.
USPC ............ 384/452; 384/608; 384/613; 384/619

(58) Field of Classification Search
USPC ......... 384/129, 283, 291, 420–427, 452–455, 384/608, 613, 617–620
See application file for complete search history.

(56) References Cited

U.S. PATENT DOCUMENTS

| | | | | |
|---|---|---|---|---|
| 434,474 A | * | 8/1890 | Simonds | ................ 384/608 |
| 819,098 A | | 5/1906 | Underhill | |
| 2,488,825 A | * | 11/1949 | Palumbo | ................ 384/453 |
| 7,993,061 B2 | * | 8/2011 | Watai et al. | ................ 384/420 |
| 2003/0039419 A1 | | 2/2003 | Wobben | |

FOREIGN PATENT DOCUMENTS

| | | |
|---|---|---|
| DE | 667761 A | 10/1938 |
| DE | 815872 B | 10/1951 |
| DE | 1921776 U | 8/1965 |
| DE | 2424859 A1 | 11/1975 |
| DE | 10320424 A1 | 11/2004 |
| DE | 102007054205 A1 | 5/2009 |
| DE | 102008061912 A1 | 6/2010 |
| EP | 2273048 A2 | 1/2011 |
| GB | 1412247 A | 10/1975 |
| WO | 03/025321 A1 | 3/2003 |
| WO | 2009062618 A2 | 5/2009 |

* cited by examiner

*Primary Examiner* — Phillip A Johnson
(74) *Attorney, Agent, or Firm* — Richard M. Goldberg

(57) ABSTRACT

A bearing arrangement having at least two parts (10, 12) rotatable relative to one another, in which one (10) of the parts has at least one annular groove (14) concentric with the axis of rotation (A), and the other part (12) has a tongue (16) that is complementary to the groove (14) and engaged therein, and in that each of the parts (10, 12) is divided into at least two sectors (10a; 12a) along separating faces that pass through the groove (14) and the tongue (16), the tongue (16) extending over all sectors (12a, 12b) of the corresponding part (12).

8 Claims, 3 Drawing Sheets

BEARING ARRANGEMENT HAVING AT LEAST TWO PARTS ROTATABLE RELATIVE TO ONE ANOTHER

BACKGROUND OF THE INVENTION

The invention relates to a bearing arrangement having at least two parts rotatable relative to one another.

Such bearing arrangements are used for example in mechanical engineering and are employed wherever two component parts are to be supported one upon the other in such a manner that they are rotatable relative to one another. A typical example is the support of a shaft in a bearing race.

When the bearing race is formed in one piece and closed, the shaft can only be inserted into the bearing race from one end when the arrangement is assembled. This means that the assembly of the bearing arrangement requires more free space in the direction of the axis of rotation than is actually needed once the assembly of the bearing arrangement has been completed. This is frequently a drawback in situations in which the bearing arrangement has to be assembled within a narrow space.

It has been known to divide the bearing race into two half races, so that the shaft may first be laid into one of the half races and the bearing arrangement may then be completed by mounting the second half race and connecting the two half races to one another. In this case it is not possible, however, to connect the two rotatable parts end-to-end. The one of the two parts that serves as bearing race must always have a significantly larger diameter than the shaft-like part. In this case, additional free space is therefore needed in the direction radial to the axis of rotation.

SUMMARY OF THE INVENTION

It is an object of the invention to provide a bearing arrangement which has a compact construction and can be assembled even under limited spatial conditions.

In order to achieve this object, one of the two parts has at least one annular groove concentric with the axis of rotation, and the other part has a tongue complementary to the groove and engaging therein, and each of the parts is divided into at least two sectors at separating faces that pass through the groove and the tongue, the tongue extending over all sectors of the associated part.

This bearing arrangement can be assembled without having to insert one of the two parts into the other in the direction of the axis of rotation. Nonetheless, both parts can have equal external diameters. In the assembly process, one takes at first one sector of the part having the groove and one sector of the part having the tongue and rotates these two sectors one into the other such that the tongue is inserted into the groove. Subsequently, two further sectors of the two parts are assembled in a corresponding manner and butted against the pair of sectors that had been assembled first. If the parts are divided into more than two sectors, one proceeds accordingly until both parts are completed. Then the parts may be rotated relative to one another about the axis of rotation, with the tongues moving in the annual grooves.

Then, in almost all phases of the rotary movement, the tongue of a single sector will extend over two sectors of the part having the grooves, so that, thanks to the curvature of the grooves and the tongues, the two parts are positively held together in any direction normal to the axis of rotation. Only incidentally, for example when the original rotary position has been reached again, the parts may theoretically fall apart into their sectors. If necessary, this can however be avoided by securing the sectors of at least one part to one another with any suitable connecting means.

In WO 2009/062618 A2 a similar assembling technique has been described for nodes and bars of a bar-type supporting framework. There, however, the bars are rotated relative to the nodes only so far that the tongues assume a position in which they respectively hold together two sectors of the part having the grooves, so that all parts are positively connected to one another. The bars are then immobilized in this angular position, so that the positive form fit is maintained stably. The idea to use such an assembling technique for forming a bearing assembly wherein one part remains always free to rotate relative to the other part has not been disclosed in this document.

Useful details of the invention are indicated in the dependent claims.

In the bearing arrangement according to the invention, the number of sectors of the individual parts, the shapes of these parts and the configuration of the grooves and tongues may vary within a wide range.

In general, each part will be divided into two sectors (half circles) only, but a division into three, four or more parts of equal or different size is also possible.

The separating faces between the individual sectors must pass through the groove and the tongue, respectively, and should be configured such that the sectors may be butted one against the other by movements that take place only in the plane normal to the axis of rotation. To that end, the separating faces need not to be plane, however, but they might optionally be curved as well. The separating faces of the different parts need not to have identical shapes, neither, but might for example extend such that in each rotary position, at least one sector of the one part overlaps with at least two sectors of the other part, which would also improve the coherence of the sectors.

The bearing surfaces of the parts, i.e. those surfaces of the parts on and in which the tongues and the grooves are formed, respectively, need not to be plane, neither. It is sufficient when each of the groove and the tongue are annular, wherein the tongue does not have to be continuous but might also be divided into sections with gaps therebetween. A particularly compact construction with the bearing arrangement according to the invention is achieved when the grooves are open in a direction that forms at most a small angle with the direction of rotation. In most practical cases the bearing surfaces will be plane and extend normal to the axis of rotation, so that the grooves open in a direction exactly parallel with the axis of rotation. Then, the bearing arrangement may be used to join two parts which have approximately equal outer diameters end-to-end, with the flanks of the grooves and tongues serving as radial bearings.

On the other hand, the two parts of the bearing arrangement need not to be bar-shaped but might in principle have arbitrary shapes. In practice, a bearing arrangement with disk-shaped parts which have a particularly small dimension in the direction of the axis of rotation is particularly attractive.

When large radial forces need to be absorbed in a radial bearing, a plurality of rings formed by the grooves and tongues may be arranged concentrically on the parts, including the possibility that the grooves and the tongues are formed alternatingly on the one part and the other. Since the tongues may plunge into the grooves only to a limited depth, the bearing arrangement is also effective as an axial bearing which can absorb axial forces that tend to approach the two parts to one another. Also, when tensional forces have to be absorbed, i.e. axial forces in the opposite direction, it is possible to form the grooves with an undercut and to form the tongues with a corresponding complementary shape.

The bearing arrangement may optionally be formed as a slide bearing, roller bearing, hydrostatic or pneumatic bearing, fluid dynamic bearing, magnet bearing or electrostatic bearing. In case of a roller bearing, the tongues will engage into the grooves with some play, and roller bodies may be accommodated in the gaps between the grooves and the tongues, preferably held in cages that extend over the length of the tongues. Lubrication is possible in the same manner as for conventional bearings.

The bearing arrangement may also be used as a hydraulically switched coupling. When the two parts are biased one against the other such that the bearing surfaces having the grooves and the tongues are firmly engaged against one another, one obtains the effect of a friction coupling. This effect may be enhanced by a wedge-shaped configuration of the grooves and the tongues. On the other hand, when a pressure fluid which may at the same time serve as lubricant is introduced into the gap between the two bearing surfaces, the bearing surfaces are pressed apart against a biasing force acting thereupon from outside, so that the coupling is released and the two parts can be rotated one relative to the other with low friction. When the grooves and tongues are shaped as dovetails, for example, the opposite effect may be achieved, i.e., the parts are frictionally coupled to one another when they are drawn apart or pressed apart hydraulically, and the coupling is released when the two parts are compressed axially. When the tongues are elastic, the coupling effect can also be achieved by hydraulically deflecting the tongues in radial direction and pressing them against the flanks of the grooves.

Obviously, the number of parts is not limited to two. For example, it is possible to form a sandwich bearing arrangement with three or more parts, with each of the inner parts having two bearing surfaces that respectively cooperate with one of the two neighbours. These inner parts may then have grooves on both sides or tongues on both sides or grooves on one side and tongues on the other side, as desired.

In case of three or more parts, the annular arrangements of grooves and tongues need not be concentric with respect to the same axis of rotation, neither, but instead the axes of rotation may be parallel and offset relative to one another or may even form an angle with one another. When the axes of rotation are parallel and offset relative to one another, it is possible for example to form a piston rod bearing.

BRIEF DESCRIPTION OF THE DRAWING

A simple embodiment example will now be explained in greater detail in conjunction with the drawings, wherein.

DETAILED DESCRIPTION

Figure 1:
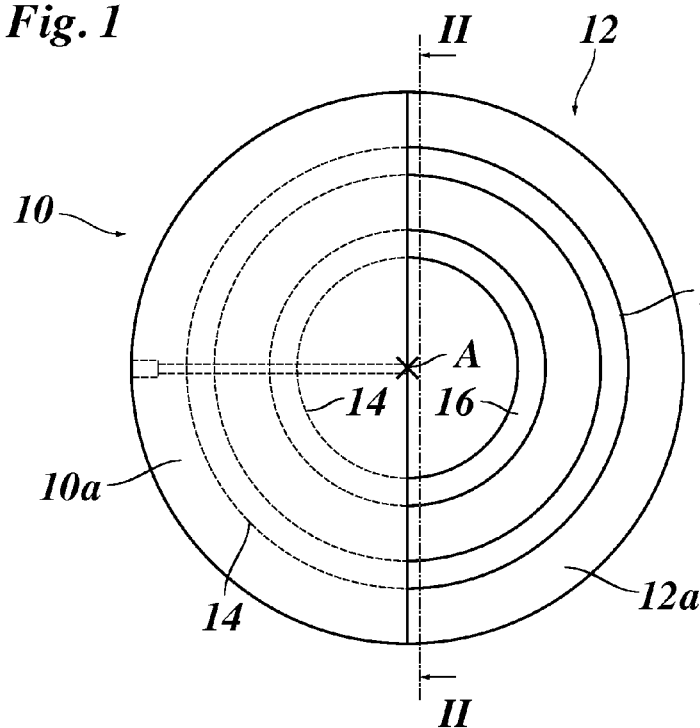
FIG. 1 is an axial view of parts of a bearing arrangement according to the invention in a first assembling step.

In the drawing, the invention is illustrated by means of an example of a bearing arrangement that consists of two parts in the form of circular disks that are engaged one against the other at an end face and are rotatable relative to one another about an axis of rotation A. Each of these parts is divided into two half-circular sectors.

Figure 2:
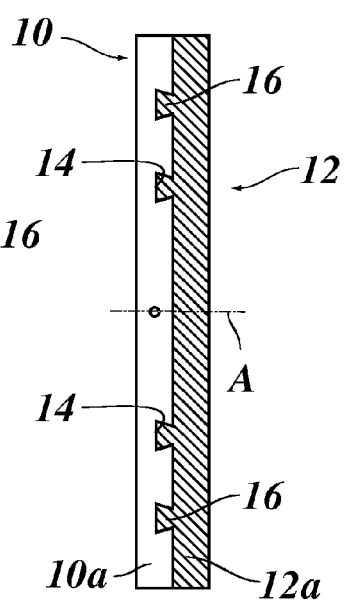
FIG. 2 shows a section along the line II-II in FIG. 1.

FIG. 1 illustrates a first assembling step in which a first sector 10*a* of a first part 10 and a first sector 12*a* of a second part 12 are held against one another in such a configuration that their contours, together, form a complete circle. As can be seen however in the sectional view in FIG. 2, the parts are offset relative to one another in the direction normal to the plane of the drawing in FIG. 1. On the back side that is not visible in FIG. 1, the part 10 has two annular grooves 14 that are centered onto the axis of rotation A and are undercut in cross-section in a dovetail configuration. Of these grooves, the sector 10*a* accommodates only a half-circular segment.

On the side that faces the first part 10, the second part 12 has two annular tongues 16 that have a dovetail profile complementary to a profile of the grooves 14 and extend in the form of half-circles over the surface of the first sector 12*a*.

Figure 3:
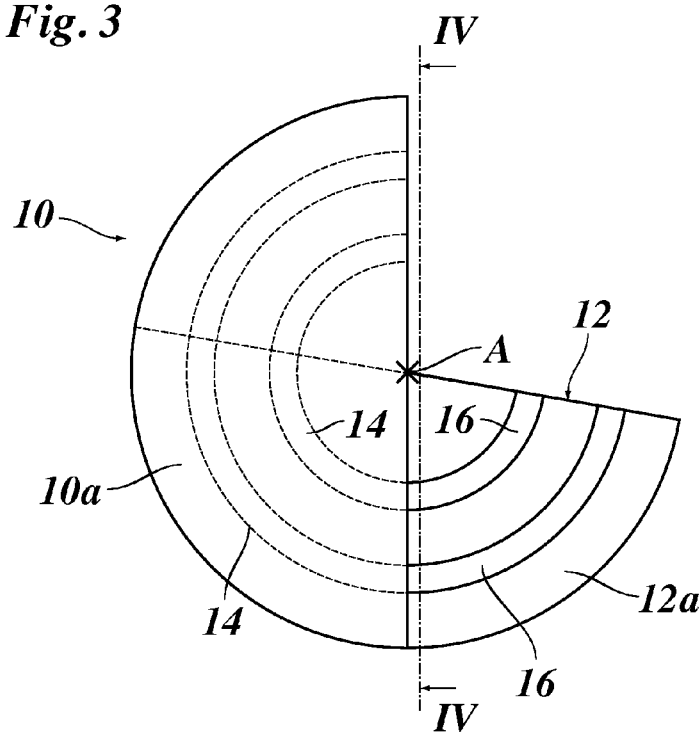
FIG. 3 is a view of the bearing arrangement in a subsequent assembling step.
Figure 4:
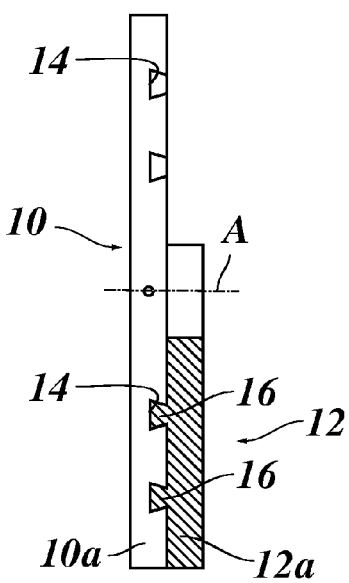
FIG. 4 is a section along the line IV-IV in FIG. 3.

FIGS. 3 and 4 illustrate an assembling step in which the sector 12*a* of the second part 12 is rotated relative to the first part 10 about the axis of rotation A of the bearing arrangement, such that the tongues 16 enter into the grooves 14.

Figure 5:
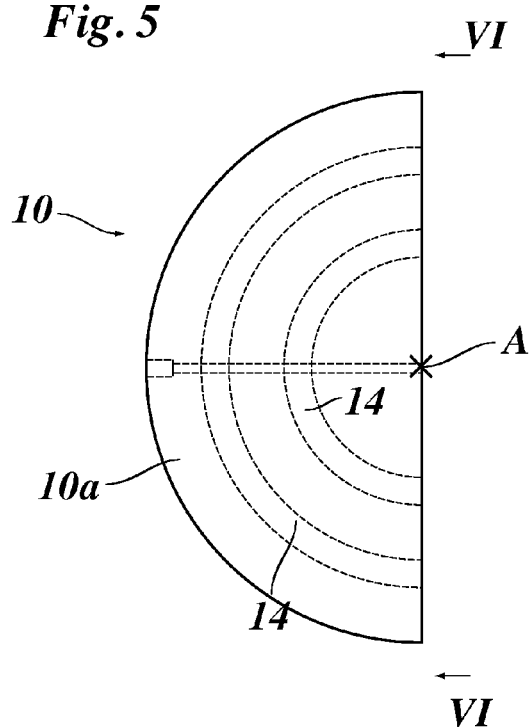
FIG. 5 is an axial view of the bearing arrangement in another assembling step.
Figure 6:
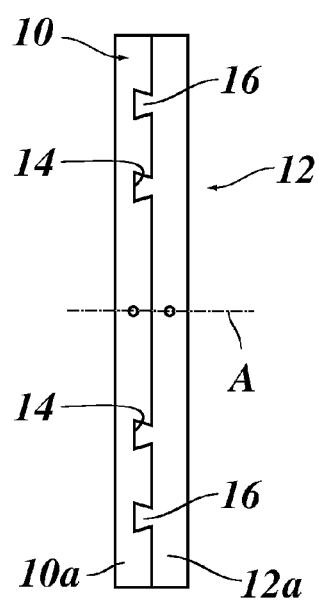
FIG. 6 is a view in the direction of arrows VI-VI in FIG. 5.

In FIGS. 5 and 6, the two sectors have been rotated one into the other to such an extent that they are completely congruent. In this configuration, the sectors are held together in positive form fit by the grooves 14 and the tongues 16, so that they may only be rotated relative to one another but may not perform any other movements relative to one another.

Figure 7:
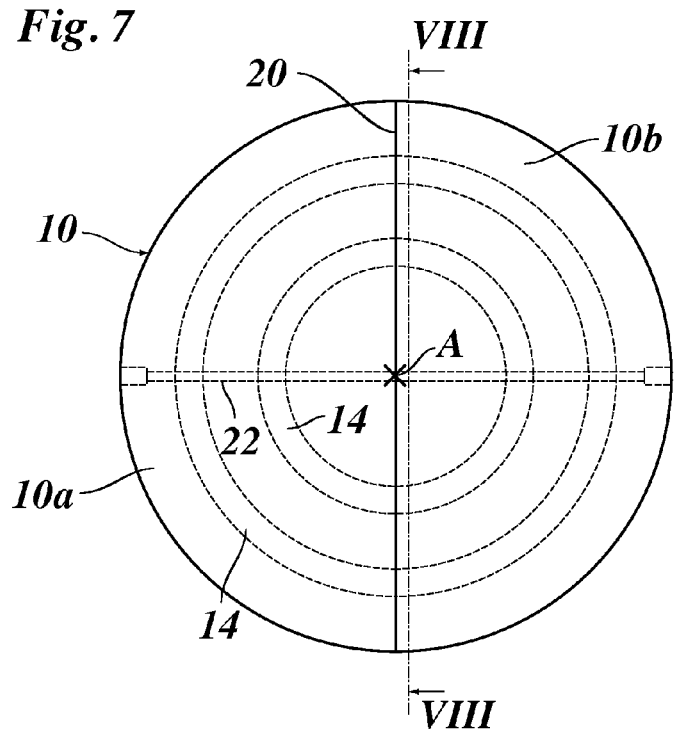
FIG. 7 is an axial view of the bearing arrangement in yet another assembling step.
Figure 8:
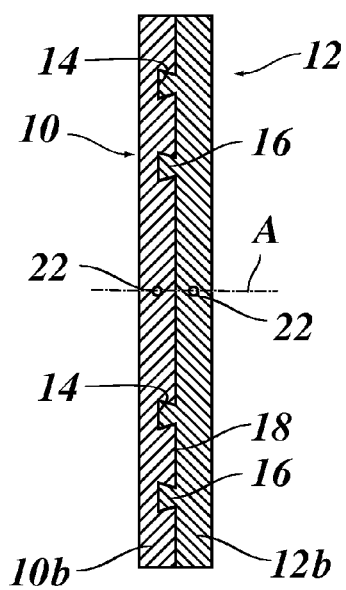
FIG. 8 is a section along the line VIII-VIII in FIG. 7.

Then, a second sector 10*b* of the first part 10 and the second sector 12*b* of the second part 12 are rotated one into the other in a corresponding manner and a butted against the sectors 10*a* and 12*a* in the manner shown in FIGS. 7 and 8. As can be seen in FIG. 8, the grooves 14 and the tongues 16 extend in half-circles also over the sectors 10*b* and 12*b*, so that they supplement each other to full circles as shown in FIG. 7.

The two parts 10, 12 are now completed and in engagement with one another at bearing surfaces 18 (FIG. 8) that extend normal to the axis of rotation A. Moreover, each part 10, 12 is divided into two sectors 10*a*, 10*b* and 12*a*, 12*b*, respectively, along a separating face 20 that passes through the axis of rotation A. In this condition, the sectors 10*a*, 10*b* of the first part and, correspondingly, the sectors 12*a*, 12*b* of the second part 12 may be mechanically connected to one another, e.g., by gluing, welding or in any other suitable way. In the example shown, each of the parts 10, 12 has a through-bore 22 that extends at right angles to the separating face 20 and in which a tension bolt may be inserted with which the two sectors are tensioned one against the other. If necessary, two parallel through-bores may be provided in order for the sectors to be held in a configuration flush with one another. For the same purpose, groove-and-tongue connections might be provided at the separating faces 20.

The bearing arrangement is now complete and the two parts 10 and 12 may be rotated relative to one another about the axis of rotation A.

Figure 9:
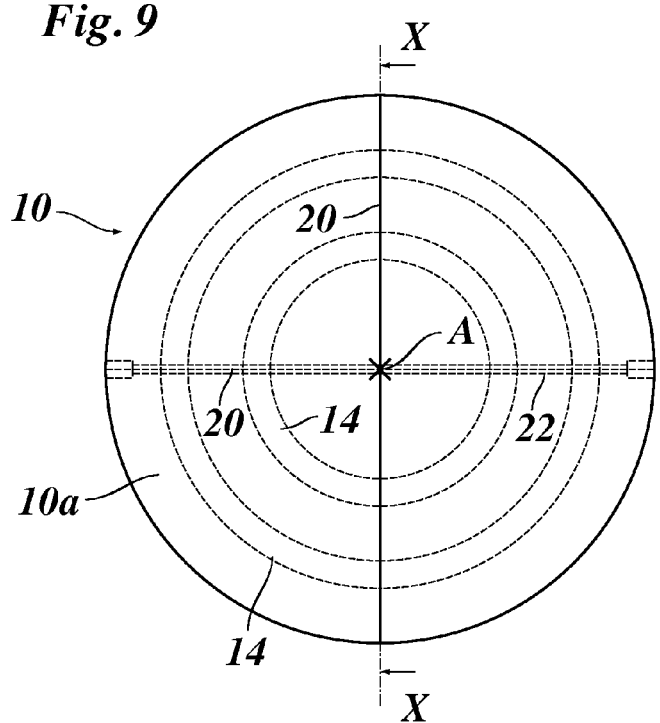
FIG. 9 is an axial view of the completely assembled bearing arrangement.
Figure 10:
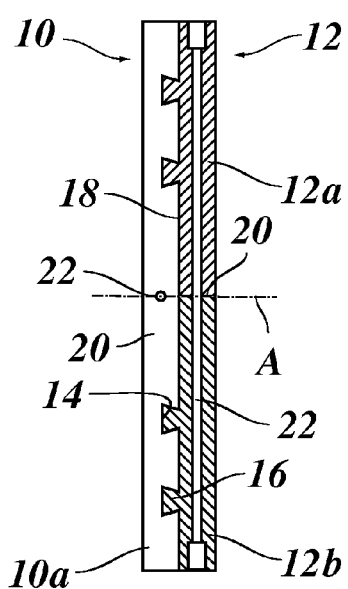
FIG. 10 is a section along the line X-X in FIG. 9.

In FIGS. 9 and 10, the two parts 10, 12 have been rotated relative to one another by an angle of 90°, so that both sectors 12*a* and 12*b* of the part 12 can be seen in FIG. 10. Here, the plane of the sectional view extends along the separating face 20 of the part 10. Thus, the through-bore 22 of the part 12 is shown in a longitudinal section in FIG. 10.

Figure 11:
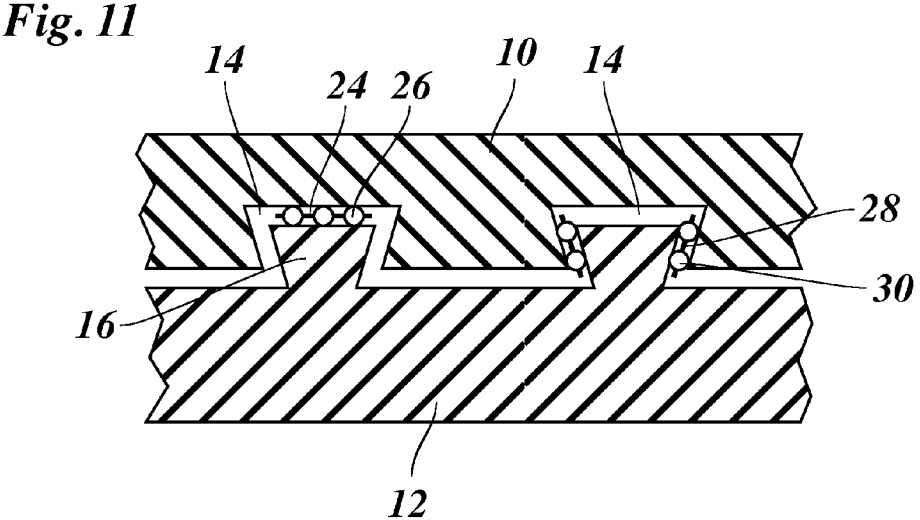
FIG. 11 is an enlarged sectional view of the bearing surfaces of the bearing arrangement according to the invention.

In order to reduce friction, the bearing arrangement may also be configured as a roller bearing, as has been exemplified in FIG. 11. Here, a cage 24 with roller bodies 26 is arranged on the bottom of one of the grooves 14 of the part 10. The cage may have a half-circular shape corresponding to the trajectory of the groove 14 in the corresponding sector of the part 10, and may be rotated into the groove 14 when the bearing arrangement is assembled. For example, the cages may at first be introduced into the grooves 14 of the sector 10a in the assembly step illustrated in FIGS. 3 to 6 and may then be rotated by an angle of 90° before the tongues 16 are rotated into the grooves. When the roller bodies roll over the bottom of the groove and the top of the tongue, the speed of the cage 24 is one half of the rotary speed of the sector 12a, so that, when the condition shown in FIGS. 5 and 6 has been reached, the cage 24 will be accommodated flush in these sectors.

The cage 24 is effective as a thrust bearing against axial forces that have the tendency to press the two parts 10 and 12 together.

In contrast, in another groove 14 of the part 10, cages 28 with roller bodies 30 are arranged at the flanks of the groove. These cages and roller bodies form a radial bearing and, thanks to the dovetail profile of the tongue 16, a tension bearing against axial forces that have the tendency to draw the parts 10 and 12 apart. The cages 28 also extend in half-circular shape in the respective sector, but have a conical configuration corresponding to the inclination of the flanks of the grooves 14. In highly loaded bearings with large diameters, it may have a negative effect that the roller bodies 30 that are held in the same cage 28 have to travel different distances because of the slightly different radii of their trajectories when they roll over the bearing surfaces without slip. If necessary, this may be compensated by using roller bodies with slightly different diameters and by adapting the width of the gap between the flanks of the groove 14 and the walls of the tongues 16 accordingly.

What is claimed is:

1. A bearing arrangement comprising:
    at least two parts rotatable relative to one another about an axis of rotation,
    one of the parts having at least one annular groove concentric with the axis of rotation,
    the other part having at least one annular tongue that is complementary to the at least one annular groove and engaged therein, and
    each of the parts divided into at least two sectors along separating faces that pass through the at least one annular groove and the at least one annular tongue, each tongue extending over all sectors of the corresponding part.

2. The bearing arrangement according to claim 1, wherein the parts are in engagement with one another in regions outside of the at least one annular groove and the at least one annular tongue with at least one bearing surface that extends normal to the axis of rotation.

3. The bearing arrangement according to claim 1, wherein the separating faces are planar.

4. The bearing arrangement according to claim 1, wherein each of the parts is divided into exactly two sectors.

5. The bearing arrangement according to claim 1, wherein:
    the at least one annular groove includes a plurality of concentric grooves,
    the at least one annular tongue includes a plurality of concentric tongues, and
    the parts are in engagement with one another via said plurality of concentric grooves and tongues.

6. The bearing arrangement according to claim 1, wherein each said groove and tongue has an undercut profile.

7. The bearing arrangement according to claim 1, further comprising roller bodies arranged in the at least one groove.

8. The bearing arrangement according to claim 7, wherein the roller bodies are held in respective cages each having a length which respectively corresponds to a segment of the at least one groove in a corresponding sector.

* * * * *